United States Patent [19]

Kavanaugh

[11] 3,857,539

[45] Dec. 31, 1974

[54] SAFETY MIRROR ASSEMBLY

[76] Inventor: Harry H. Kavanaugh, 4101 N. Grand Blvd., Peoria, Ill. 61614

[22] Filed: May 10, 1973

[21] Appl. No.: 359,068

Related U.S. Application Data

[63] Continuation-in-part of Ser. No. 201,001, Nov. 22, 1971, abandoned.

[52] U.S. Cl. .................. 248/475 R, 248/226 R
[51] Int. Cl. ............................. B60r 1/00
[58] Field of Search........ 248/475 R, 476, 477, 478, 248/479, 480, 481, 482, 483, 484, 485, 486, 487, 488, 226 R, 226 B, 226 C, 226 D, 307; 224/42.45 R

[56] References Cited
UNITED STATES PATENTS

| | | | |
|---|---|---|---|
| 3,172,633 | 3/1965 | Allen | 248/226 R |
| 3,189,309 | 6/1965 | Hager | 248/478 |
| 3,259,349 | 7/1966 | Lee | 248/480 |
| 3,260,490 | 7/1966 | Trautner | 248/480 |
| 3,294,438 | 12/1966 | Carson et al. | 248/226 C X |
| 3,488,026 | 1/1970 | Wallace et al. | 248/226 B X |
| 3,729,163 | 4/1973 | Cummins | 248/487 |
| 3,778,015 | 12/1973 | Holzman | 248/475 R |

Primary Examiner—William H. Schultz
Attorney, Agent, or Firm—Markva & Smith

[57] ABSTRACT

A safety mirror assembly is secured to a door of an automobile or truck so that all blind spots are eliminated and the driver of the vehicle has full vision in any direction. The assembly includes a generally C-shaped bracket member supporting a mirror. The bracket member has an upper arm portion extending substantially horizontally and a lower arm portion extending generally downwardly with respect to the upper arm portion. The bracket member has an angle shaped hook formed at the end of the upper portion and a U-shaped hook formed at the end of the lower arm portion so that the upper arm portion is attachable to a window sill of a vehicle door and the lower arm portion is attachable to a lower edge of the vehicle door.

8 Claims, 2 Drawing Figures 3,857,539

SAFETY MIRROR ASSEMBLY

RELATED APPLICATION

This is a continuation-in-part of application Ser. No. 201,001, filed Nov. 22, 1971, now abandoned.

BACKGROUND OF THE INVENTION

This invention relates generally to vehicle rear view mirrors. More specifically, the present invention relates to rear view mirror mounting bracket assemblies.

It is generally well known to all motorists that a conventional rear view mirror does not always afford a full view due to its position on the side of the vehicle. Consequently, there may be a blocking or blind spot at the rear of the vehicle which the motorist does not see and therefore can be hazardous if another vehicle is in such position so that the motorist may possibly make a maneuver that could result in a collision. This situation is, of course, objectionable and therefore in need of improvement.

PURPOSE OF THE INVENTION

The primary object of the invention is to provide a safety no-blind vision mirror bracket assembly which eliminates a blind spot in the vision of a vehicle driver.

Another object of the present invention is to provide a safety no-blind-mirror bracket assembly which eliminates blind spots in a driver's vision when looking ahead, toward the right, left, or to the rear.

A further object of the present invention is to provide a safety no-blind vision bracket assembly which is readily mountable either on a right or left door of a vehicle.

Other objects of the present invention are to provide a safety mirror bracket assembly which is simple in design, inexpensive to manufacture, rugged in construction, easy to use, and efficient in operation.

SUMMARY OF THE INVENTION

These and other objects are accomplished through the use of the safety mirror bracket assembly as disclosed herein. The safety mirror assembly of this invention includes a generally C-shaped bracket member supporting a mirror. The bracket member has an upper arm portion extending substantially horizontally, a lower arm portion extending generally downwardly with respect to the upper arm portion and a substantially vertical intermediate portion which is horizontally laterally displaced with respect to the upper end of the bracket member when it is firmly attached to the vehicle door. The generally C-shaped bracket member is braced in a forwardly and rearwardly direction so that it is rigidly positionable upon the vehicle door. The upper and lower arm portions are drawn together for securing the generally C-shaped bracket member firmly against the window sill and the lower edge, respectively, of the vehicle door.

Another feature of the invention is directed to the use of a two-piece bracket member having a top section and a bottom section. The top and bottom sections may be joined in any desired way. In a specific embodiment, one of the sections includes an expanded diameter to receive the end of the other section.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
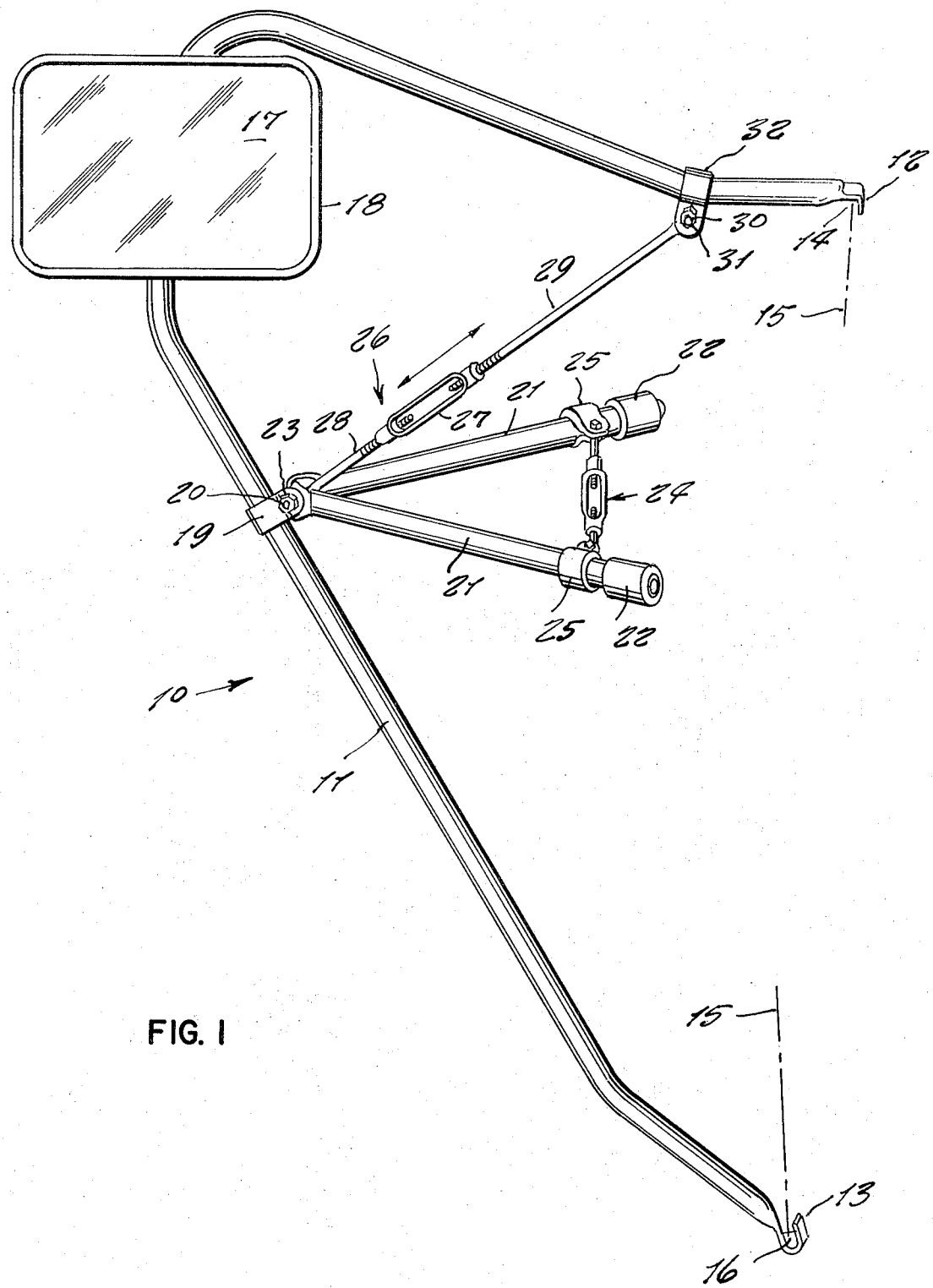
FIG. 1 is a perspective view of a safety mirror bracket assembly made in accordance with this invention.

More specifically, a safety no-blind vision bracket assembly, generally designated 10, includes a configurated bracket member or bar 11 that is bent into the shape as shown in the drawing. That is, the generally C-shaped bracket member 11 has an upper arm portion extending substantially horizontally, a lower arm portion extending generally downwardly with respect to the upper arm portion and a substantially vertical intermediate portion which is horizontally laterally displaced with respect to the upper end of the bracket bar or member 11 when firmly attached to the vehicle door 15.

The bracket member or bar 11 is made of a strong metal with an upper end thereof being fashioned as a generally flat angular hook 12 while a lower end of the bar 11 is fashioned into a generally U-shaped hook 13 of a flat character. The hook 12 has a structural configuration adapted to fit over an upper edge or window sill 14 of a vehicle door 15. The lower hook 13 has a structural configuration adapted to fit under a lower edge 16 of the door 15.

The intermediate portion of the bracket member or bar 11 supports a mirror 17 fitted within a frame 18. The frame 18 is fully adjustable in position and direction in a manner known in the prior art. In the embodiment shown in FIG. 1, the bracket member 11 has a unitary or one-piece construction. The top of the mirror frame 18 fits under or below the upper arm portion as shown in the drawings. As is clearly shown, the mirror bracket assembly 10 can be readily mounted for rear view vision on either side of the vehicle. That is, it is clearly universally usable and reversible with respect to a vehicle having doors on either side thereof.

A clip 19 is fitted around the bracket member or bar 11 at a position below the mirror frame 18. The clip 19 supports a cap screw 20 fitted through the ends of a pair of diverging legs 21. The legs 21 are each provided with a tip 22 located at their ends opposite the clip 19. The tips 22 are especially designed to be positioned against the outer side of the vehicle door 15 without marring the surface thereof. The cap screw 20 is fitted with a nut 23. The legs 21 diverge sidewardly to provide bracing in a forwardly and rearwardly direction so that together with the upper hook 12 and lower hook 13, the bracket or bar member 11 is rigidly positioned upon the door 15.

The diverging legs 21 constitute bracing means which also includes a turnbuckle unit 24 attached at its opposite ends to clips 25 which are secured to the legs 21. The turnbuckle unit 24 is then usable to retain the legs 21 in a desired spaced apart relationship.

Another turnbuckle unit 26 constitutes a securing means that is fixedly attached to the upper and lower arm portions of the generally C-shaped bracket member 11. The turnbuckle unit 26 includes turnbuckle 27 and rods 28 and 29 which at their opposite ends are attached to cap screws 30 and 20 secured by nuts 31 and 23, respectively. The cap screws 30 and 20 are fitted through clips 32 and 19, respectively. Thus, the turnbuckle unit 21 serves to draw the upper and lower arm portions of the C-shaped bracket member or bar 11 toward each other or together for securing the C-shaped bracket member 11 firmly against the window sill 14 and the lower edge 16, respectively, of the vehicle door 15.

Figure 2:
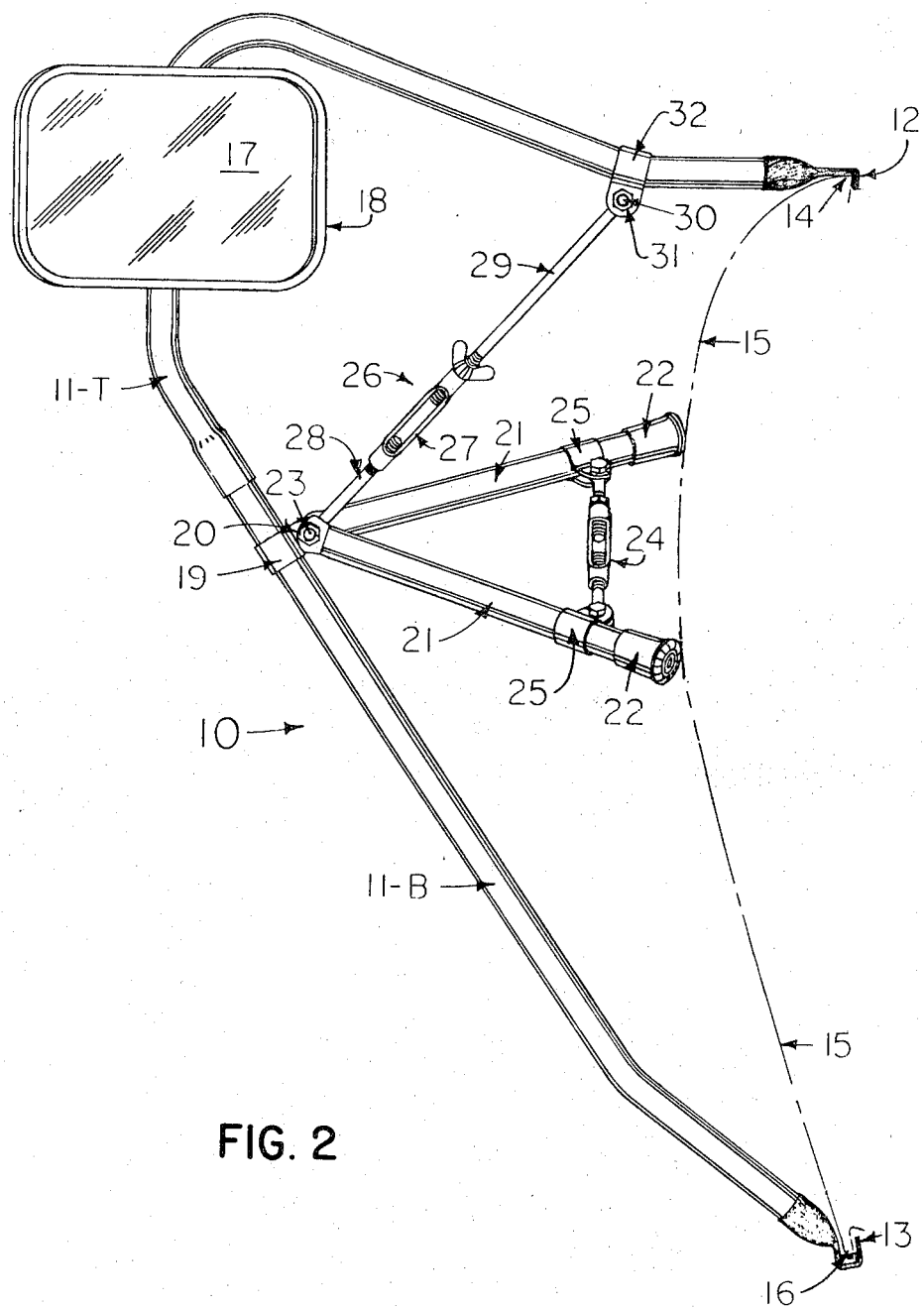
FIG. 2 is another embodiment of a safety mirror assembly made in accordance with this invention.

A further embodiment of the invention is shown in FIG. 2 wherein the assembly 10 includes a two-piece bracket member having a top section 11-T and a bottom section 11-B. The end of the top section 11-T is opened up or expanded at a location just below the mirror fram 18 to receive the end of the bottom section 11-B therein. It is within the contemplation of this invention that the top section 11-T and bottom section 11-B may be joined together in any appropriate manner to accomplish the desired result.

While the safety mirror assembly has been shown and described in detail, it is obvious that this invention is not to be considered as being limited to the exact form disclosed, and that changes in detail and construction may be made therein within the scope of the invention, without departing from the spirit thereof.

The embodiments of the invention in which an exclusive property or privilege is claimed are defined as follows:

1. A safety mirror assembly comprising:
   a. a bracket bar supporting a mirror,
   b. said bracket bar having an angle shaped hook formed on an upper end and a U-shaped hook formed on a lower end thereof,
   c. a pair of diverging legs supported at one end by a clip fitted around an intermediate portion of said bracket bar,
   d. the opposite diverging ends of said pair of legs being fitted with a tip for positioning against the outer side of a vehicle door,
   e. a first turnbuckle unit disposed between diverging ends of said legs to maintain said diverging ends at a fixed distance, and
   f. a second turnbuckle unit disposed between an upper and lower portion of said bracket bar for firmly retaining said upper and lower hook ends firmly against the upper and lower edges, respectively, of said vehicle door.

2. A safety mirror assembly for use on a vehicle door comprising:
   a. a generally C-shaped bracket member supporting a mirror,
   b. said bracket member having an upper arm portion extending substantially horizontally and a lower arm portion extending generally downwardly with respect to the upper arm portion,
   c. said bracket member having an angle shaped hook formed at the end of the upper arm portion and a U-shaped hook formed at the end of the lower arm portion so that the upper arm portion is attachable to a window sill of the vehicle door and the lower arm portion is attachable to a lower edge of the vehicle door,
   d. said bracket member including a substantially vertical intermediate portion which is horizontally laterally displaced with respect to the upper end of said bracket member when firmly attached to the vehicle door,
   e. said mirror being mounted on the intermediate portion,
   f. means for bracing said generally C-shaped bracket member in a forwardly and rearwardly direction so that it is rigidly positionable upon the vehicle door, and
   g. means attached to the upper and lower arm portions to draw said arm portions together for securing said generally C-shaped bracket member firmly against the window sill and the lower edge, respectively, of said vehicle door.

3. An assembly as defined in claim 2 wherein said securing means includes a turnbuckle unit fixedly attached to the upper and lower arm portions of the generally C-shaped bracket member.

4. An assembly as defined in claim 2 wherein said bracing means comprises a pair of diverging legs which are connected at one end to the lower arm portion of the generally C-shaped bracket and extend inwardly in the same direction as said arm portions for resting the other end of said diverging legs against the outer side of said vehicle door.

5. An assembly as defined in claim 4 wherein the bracing means includes a turnbuckle unit extending between said diverging legs.

6. An assembly as defined in claim 2 wherein said bracket member has a one-piece construction.

7. An assembly as defined in claim 2 wherein said bracket member has a two-piece construction including a top section and a bottom section and means for joining said top section and said bottom section.

8. An assembly as defined in claim 7 wherein one of the sections has an expanded end diameter sufficient to receive the end of the other section therein.

* * * * *